(12) United States Patent
Singh et al.

(10) Patent No.: US 9,303,515 B2
(45) Date of Patent: Apr. 5, 2016

(54) TURBOMACHINE DIAPHRAGM AND METHOD OF REPAIRING A TURBOMACHINE DIAPHRAGM

(75) Inventors: Anshuman Singh, Simpsonville, SC (US); Paul Lawrence Kalmar, Zirconia, NC (US); Graham David Sherlock, Houston, TX (US); Americo Zapata, League City, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 844 days.

(21) Appl. No.: 13/599,145

(22) Filed: Aug. 30, 2012

(65) Prior Publication Data

US 2014/0064954 A1 Mar. 6, 2014

(51) Int. Cl.
*F01D 9/00* (2006.01)
*F01D 5/00* (2006.01)
*F01D 11/00* (2006.01)
*B23P 6/00* (2006.01)

(52) U.S. Cl.
CPC .................. *F01D 5/005* (2013.01); *B23P 6/005* (2013.01); *F01D 11/001* (2013.01); *Y10T 29/49318* (2015.01)

(58) Field of Classification Search
CPC ........... F01D 25/246; F01D 9/02; F01D 9/04; F01D 11/001; F01D 11/02; F05D 2230/80; B23P 6/005; Y10T 29/49719
See application file for complete search history.

(56) References Cited

U.S. PATENT DOCUMENTS

| | | | | |
|---|---|---|---|---|
| 4,924,581 | A | * | 5/1990 | Jakobsen ................... 29/402.02 |
| 5,980,204 | A | * | 11/1999 | Chevrette ................... 415/174.5 |
| 7,985,046 | B2 | | 7/2011 | Gaul et al. |
| 8,123,474 | B2 | | 2/2012 | Gaul et al. |
| 2010/0290902 | A1 | | 11/2010 | Gaul et al. |
| 2011/0070073 | A1 | | 3/2011 | Gaul et al. |

* cited by examiner

*Primary Examiner* — Craig Kim
*Assistant Examiner* — Kayla McCaffrey
(74) *Attorney, Agent, or Firm* — Dority & Manning, PA

(57) ABSTRACT

A turbomachine diaphragm includes a sealing section having a first end portion that extends to a second end portion through an intermediate portion. At least one rail member includes a first end section that extends from the first end portion of the sealing section to a second end section through an intermediate section having an inner surface section and an outer surface section. The second end section includes a machined surface having a repair coupon mounting element. A repair coupon is mounted at the repair coupon mounting element and operatively connected to the at least one rail member. A method of repairing a turbomachine diaphragm is also disclosed herein.

23 Claims, 17 Drawing Sheets

TURBOMACHINE DIAPHRAGM AND METHOD OF REPAIRING A TURBOMACHINE DIAPHRAGM

BACKGROUND OF THE INVENTION

The subject matter disclosed herein relates to the art of turbomachines and, more particularly, to a turbomachine diaphragm and a method of repairing a turbomachine diaphragm.

In a turbomachine, air is passed into an inlet of a compressor. The air is passed through various stages of the compressor to form a compressed airflow. A portion of the compressed airflow is passed to a combustion assembly and another portion of the compressed airflow is passed to a turbine portion and used for cooling. In the combustion assembly, the compressed airflow is mixed with fuel and combusted to form a high temperature gas stream and exhaust gases. The high temperature gas stream is channeled to the turbine portion via a transition piece. The transition piece guides the high temperature gas stream toward a hot gas path of the turbine portion. The high temperature gas stream expands through various stages of the turbine portion converting thermal energy to mechanical energy that rotates a turbine shaft. The turbine portion may be used in a variety of applications including providing power to a pump, an electrical generator, a vehicle, or the like.

BRIEF DESCRIPTION OF THE INVENTION

According to one aspect of the exemplary embodiment, a turbomachine diaphragm includes a sealing section having a first end portion that extends to a second end portion through an intermediate portion. At least one rail member includes a first end section that extends from the first end portion of the sealing section to a second end section through an intermediate section having an inner surface section and an outer surface section. The second end section includes a machined surface having a repair coupon mounting element. A repair coupon is mounted at the repair coupon mounting element and operatively connected to the at least one rail member.

According to another aspect of the exemplary embodiment, a method of repairing a turbomachine diaphragm includes removing a worn coupon from a diaphragm rail member forming a machined surface, forming a repair coupon mounting element in the diaphragm rail member, positioning a repair coupon on the diaphragm rail member at the repair coupon mounting element, and bonding the repair coupon to the machined surface at the repair coupon mounting element.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
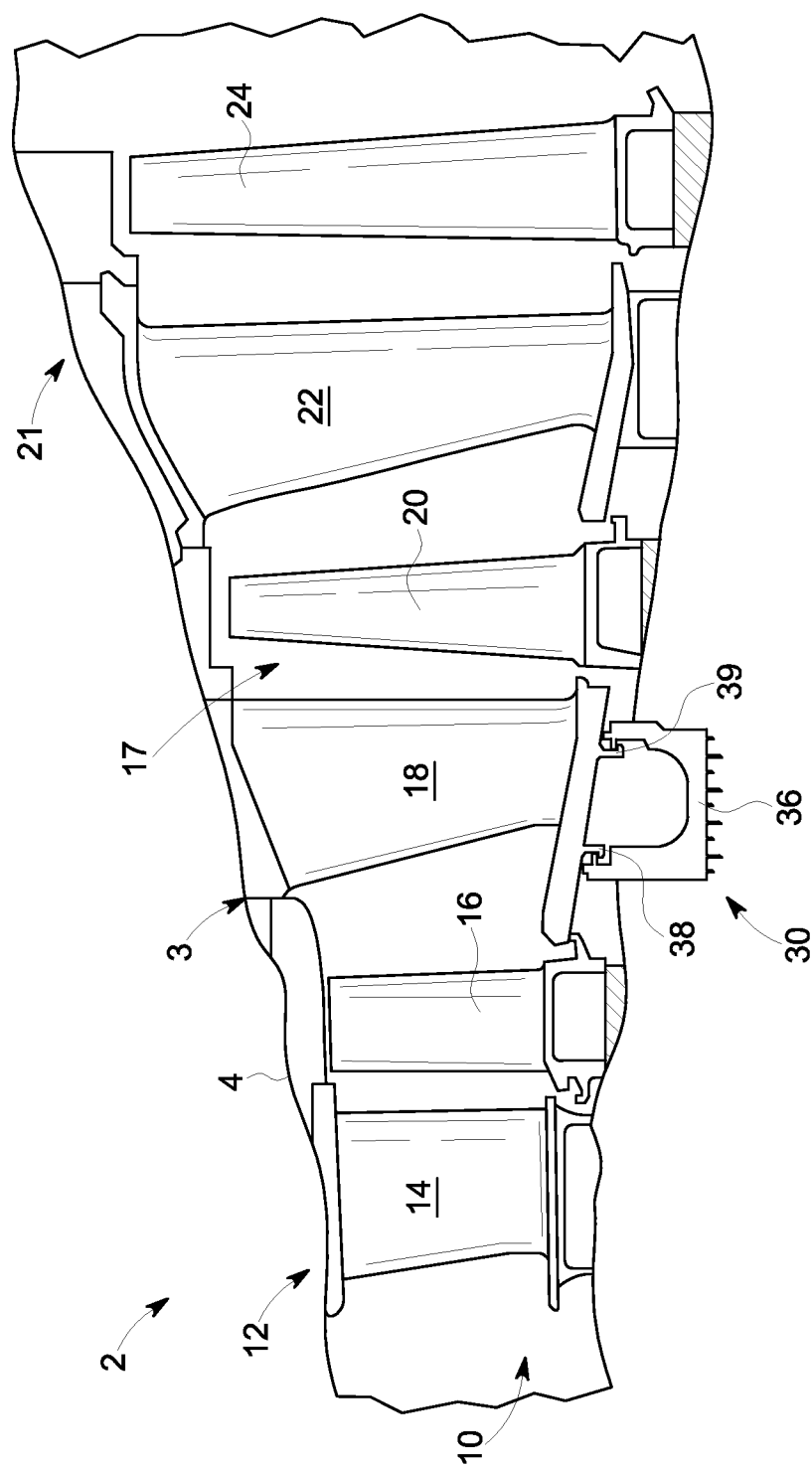
FIG. 1 is a schematic view of a turbomachine including a diaphragm in accordance with an exemplary embodiment.

Referring to FIG. 1, a turbomachine, in accordance with an exemplary embodiment, is indicated generally at 2. Turbomachine 2 includes a turbine portion 3 having a housing 4 that defines, at least in part, a hot gas path 10. Turbine portion 3 includes a first stage 12, having a plurality of first stage vanes or nozzles 14, and first stage buckets or blades 16; a second stage 17 having a plurality of second stage vanes or nozzles 18 and second stage buckets or blades 20; and a third stage 21 having a plurality of third stage vanes or nozzles 22 and third stage buckets or blades 24. Of course it should be understood that turbine portion 3 could also include additional stages (not shown).

Hot combustion gases flow axially along hot gas path 10 through nozzles 14, 18, and 22, impact and rotate blades 16, 20, and 24. In addition, a cooling airflow is guided into a wheelspace (not separately labeled) of turbine portion 3. The cooling airflow, typically from a compressor portion (not shown) is directed through various components of turbine portion 3 to reduce localized hot spots, improve wear, and increase an overall component life. Each nozzle 14, 18, and 22 includes a corresponding diaphragm, one of which is shown at 30, that provides a seal which prevents hot gases from passing from hot gas path 10 into the wheelspace. Diaphragm 30 cooperates with additional structure, (not shown), to limit ingestion of hot gases into the wheelspace. Loss of hot gases from hot gas path 10 into the wheelspace reduces operational efficiency of turbine portion 3. Over time, portions of diaphragm 30 may become worn and require localized repair as will be discussed more fully below.

Figure 2:
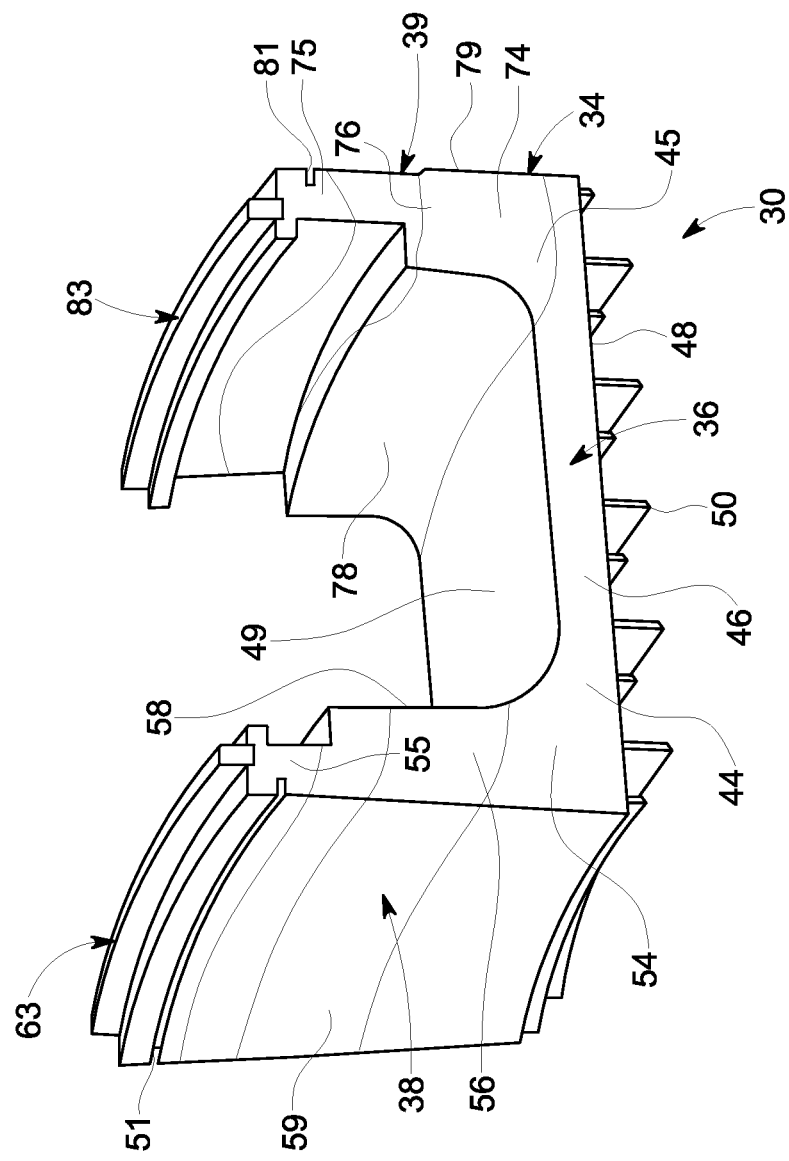
FIG. 2 is a perspective view of a diaphragm including a repair coupon in accordance with an exemplary embodiment.

Reference will now follow to FIG. 2 in describing a repaired diaphragm 30 in accordance with one aspect of an exemplary embodiment. Repaired diaphragm 30 includes a body 34 having a sealing section 36, a first rail member 38 and a second rail member 39. Sealing section 36 includes a first end portion 44 that extends to a second end portion 45 through an intermediate portion 46 that defines an outer surface portion 48 and an inner surface portion 49. Outer surface portion 48 is provided with a plurality of seal elements 50 that cooperate with additional structure (not shown) arranged in the wheel space of turbine portion 3. First rail member 38 extends from first end portion 44 and second rail member 39 extends from second end portion 45. First rail member 38 includes a first end section 54 that extends to a second end section 55 through an intermediate section 56 that defines an inner surface section 58 and an outer surface section 59. Outer surface section 59 includes a discourager seal mounting section 51 that supports a discourager seal (not separately labeled). Second end section 55 supports a repair coupon 63. Repair coupon 63 replaces the original coupon (not shown) that was provided on first rail member 38. As will become more fully evident below, repair coupon 63 is joined to first rail member 38 using a variety of techniques.

Similarly, second rail member 39 includes a first end section 74 that extends to a second end section 75 through an intermediate section 76 that defines an inner surface section 78 and an outer surface section 79. Outer surface section 79 includes a discourager seal mounting section 81 that supports a discourager seal (not separately labeled). Second end section 75 supports a repair coupon 83 that replaces the original coupon (not shown) provided on second rail member 39. More specifically, over time the original coupons wear. Worn coupon may allow hot gasses to flow from hot gas path 10 into the wheel space or other regions of the turbomachine. The loss of gases from the hot gas path 10 reduces turbine efficiency. Accordingly, diaphragms are either repaired or replaced during a maintenance interval. In accordance with the exemplary embodiment, instead of a labor intensive repair of the original coupon, the exemplary embodiment discloses various techniques for replacing the original coupon with a repair coupon.

Figure 3:
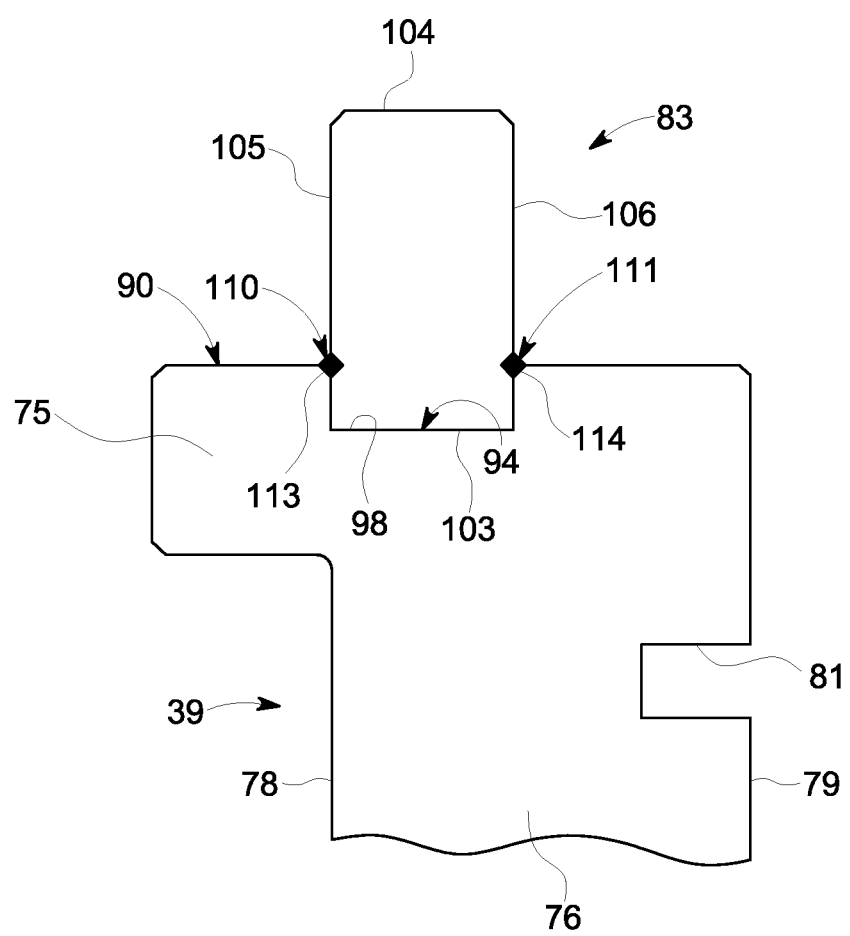
FIG. 3 is a partial plan view of a repair coupon mounted to a diaphragm rail member in accordance with one aspect of the exemplary embodiment.

Reference will now be made to FIG. 3 in describing repair coupon 83 with an understanding that repair coupon 63 is bonded to first rail member 38 in a similar manner. Second end section 75 includes a machined surface 90 including a repair coupon mounting element 94. More specifically, second end section 75 is machined to remove the original coupon and form repair coupon mounting element 94. In the exemplary embodiment shown, repair coupon mounting element 94 takes the form of a slot 98 having a substantially rectangular profile formed in machined surface 90. With this arrangement, repair coupon 83 is positioned within slot 98 and bonded to second rail member 39. More specifically, repair coupon 83 includes first and second opposing ends 103 and 104 that are joined by first and second opposing sides 105 and 106 forming a substantially rectangular cross-section. First end 103 is nested within slot 98. A first metallurgical bond 110 is formed between second end section 75 and first side 105 and a second metallurgical bond 111 is formed between second end section 75 and second side 106. Metallurgical bonds 110 and 111 take the form of welds 113 and 114 that bond repair coupon 83 to second rail member 39.

Figure 4:
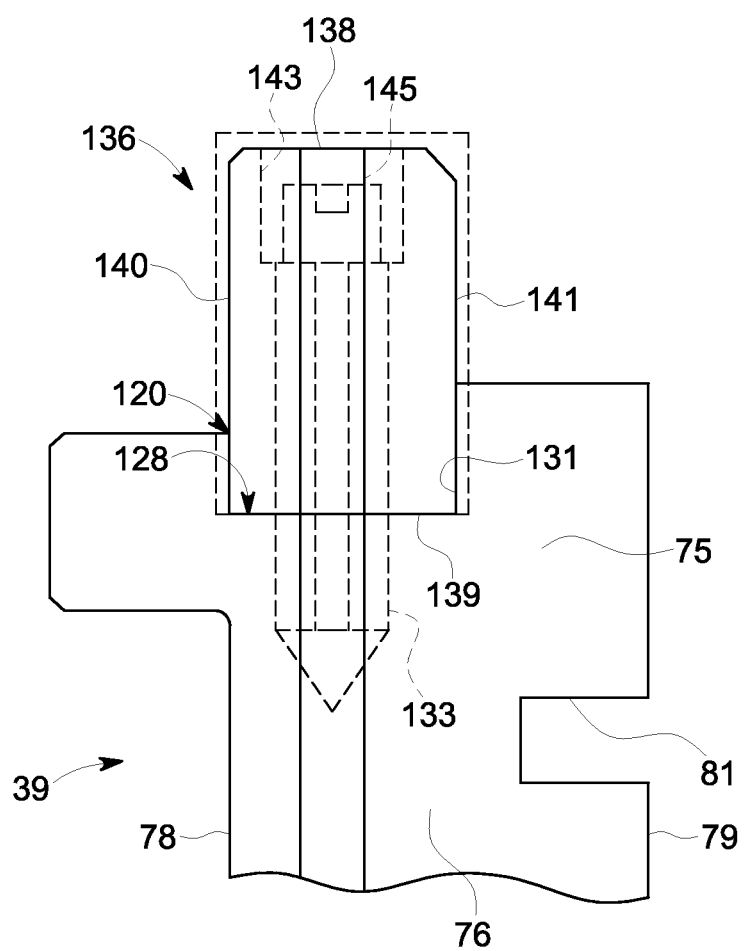
FIG. 4 is a partial plan view of a repair coupon mounted to a diaphragm rail member in accordance with another aspect of the exemplary embodiment.

Reference will now be made to FIG. 4, wherein like reference numbers represent corresponding parts in the respective views, in describing second end section 75 of second rail member 39 in accordance with another aspect of the exemplary embodiment. Second end section 75 is processed to remove the original coupon and form a machined surface 120. A repair coupon mounting element 128 is formed in machined surface 120. Repair coupon mounting element 128 takes the form of a slot 131 including one or more threaded openings 133. A repair coupon 136 is mounted in slot 131 and joined to second end section 75. Repair coupon 136 includes first and second opposing ends 138 and 139 joined by first and second opposing sides 140 and 141 forming a generally rectangular cross-section. Repair coupon 136 includes a central opening 143 that is configured to align with threaded opening 133 formed in slot 131. A mechanical fastener 145 is passed through central opening 143 and engaged with threaded opening 133 to bond repair coupon 136 to second end section 75. It should be understood that the number of mechanical fasteners and associated structure may vary.

Figure 5:
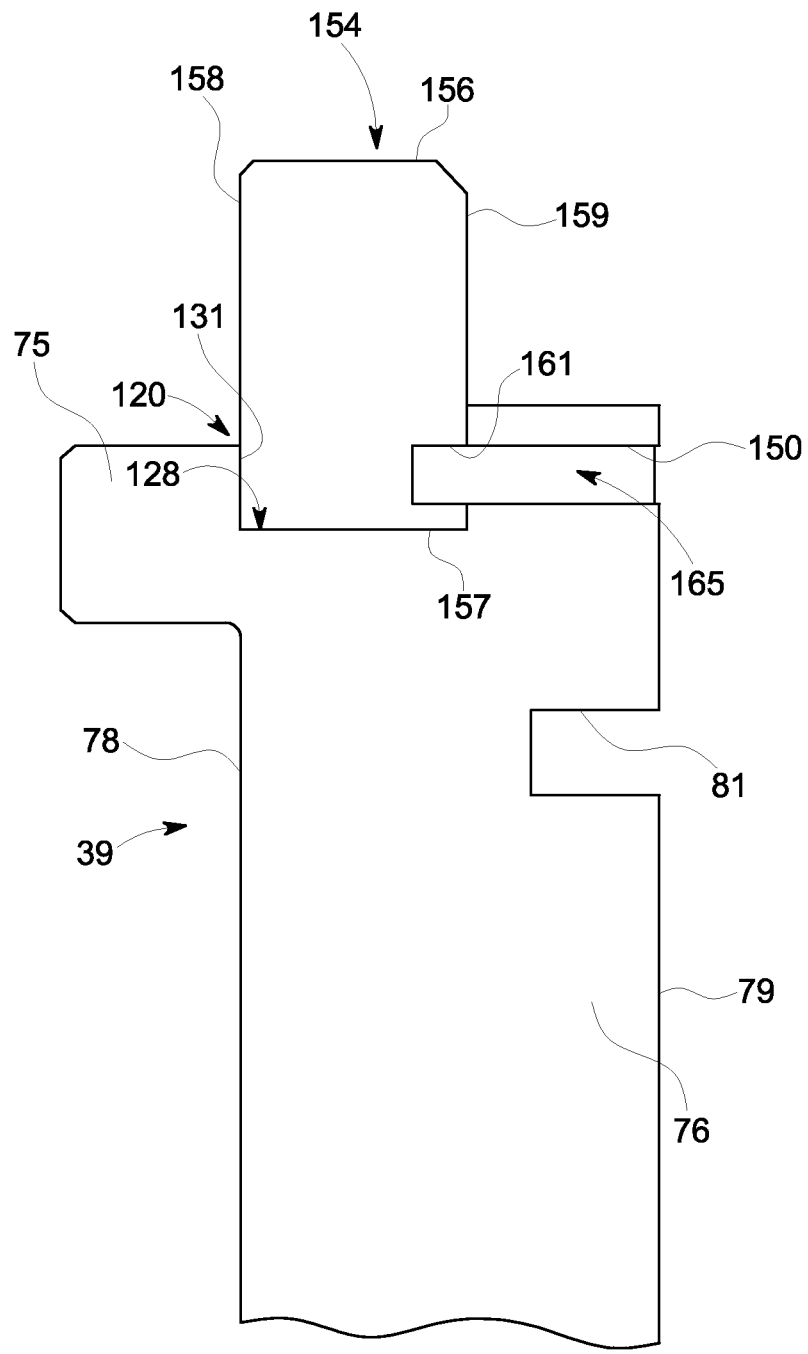
FIG. 5 is a partial plan view of a repair coupon mounted to a diaphragm rail member in accordance with yet another aspect of the exemplary embodiment.

FIG. 5, wherein like reference numbers represent corresponding parts in the respective views, illustrates an opening 150 formed in second rail member 39. Opening 150 extends from outer surface section 79 into slot 131. With this arrangement, a repair coupon 154 is positioned in slot 131 and joined to second end section 75. Repair coupon 154 includes first and second ends 156 and 157 that are joined by first and second opposing sides 158 and 159 that form a generally rectangular profile. Second side 159 is provided with a receiver portion 161 that aligns with opening 150 when repair coupon 154 is seated within slot 131. A fastener member 165 is passed through opening 150 and into receiver portion 161. Fastener member 165 may be bonded to outer surface section 79 through a metallurgical bond (not shown) or joined to second end section 75 using other systems including both mechanical bonds and chemical/metallurgical bonds.

Figure 6:
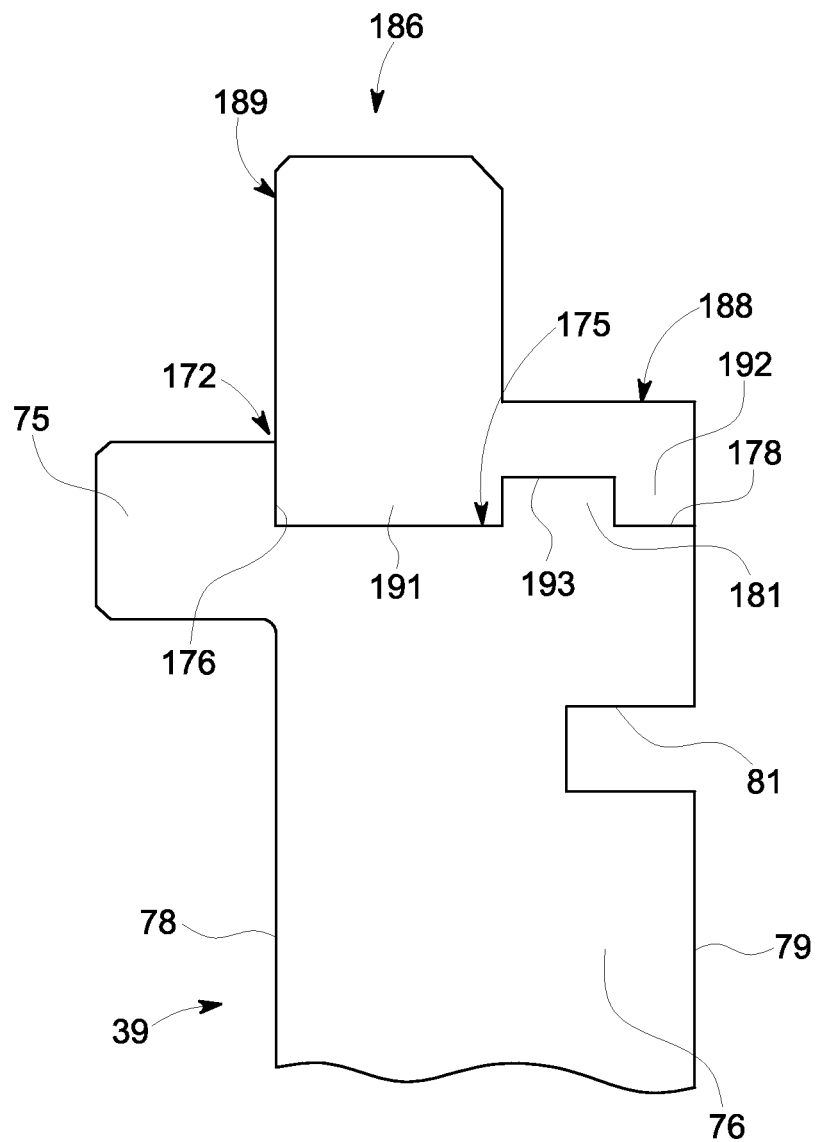
FIG. 6 is a partial plan view of a repair coupon mounted to a diaphragm rail member in accordance with still another aspect of the exemplary embodiment.

FIG. 6, wherein like reference numbers represent corresponding parts in the respective views, illustrates a machined surface 172 in accordance with an exemplary aspect formed in second end section 75 of second rail member 39. In addition to removing the original coupon, a repair coupon receiving element 175 is formed in second end section 75. Repair coupon receiving element 175 takes the form of a first slot 176 spaced from a second notch or slot 178 that form a boss 181. As shown, second slot 178 extends through outer surface section 79. A repair coupon 186 is secured to second end section 75 at coupon receiving element 175. Repair coupon 186 includes a base section 188 and a seal section 189. Base section 188 includes first and second tab elements 191 and 192 that form a boss receiving portion 193. With this arrangement, boss 181 nests within boss receiving portion 193. At this point, repair coupon 186 may be bonded to second end section 75 through mechanical and/or metallurgical bonds.

Figure 7:
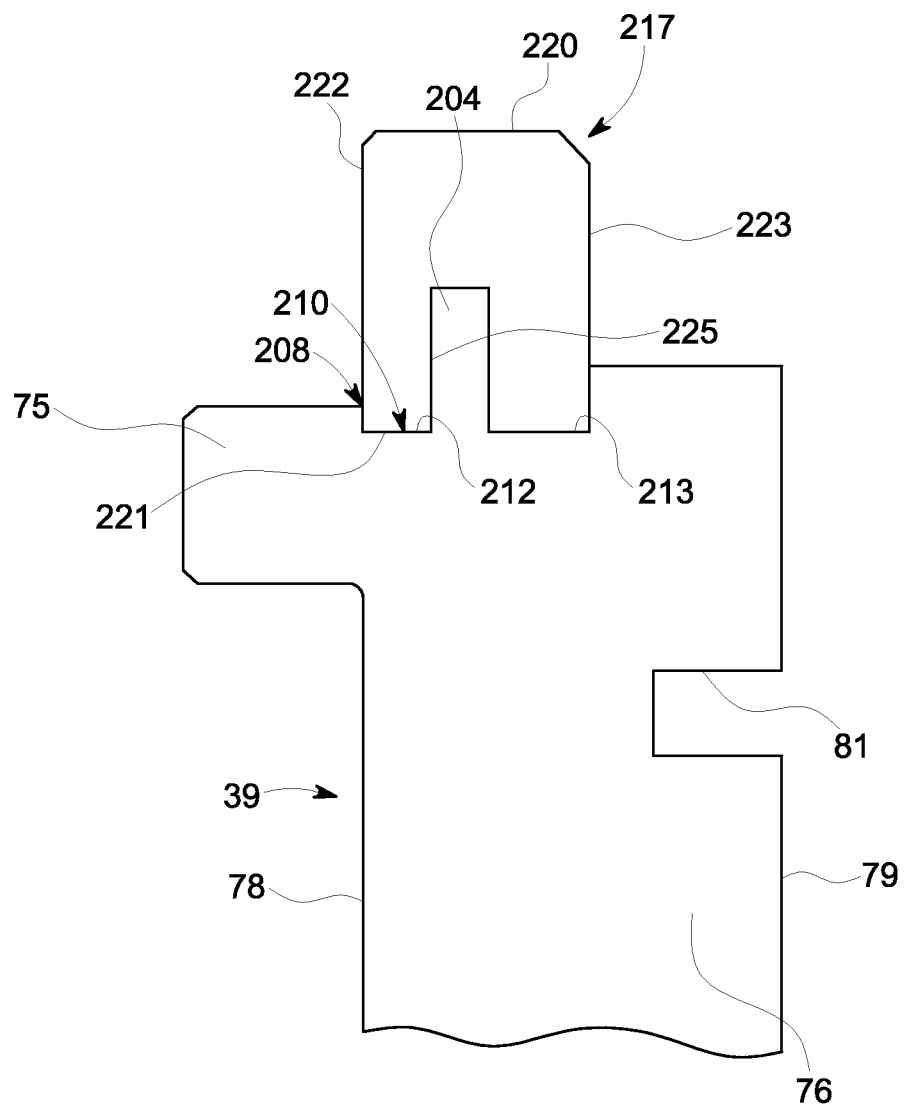
FIG. 7 is a partial plan view of a repair coupon mounted to a diaphragm rail member in accordance with still yet another aspect of the exemplary embodiment.

In FIG. 7, wherein like reference numbers represent corresponding parts in the respective views, an original coupon 204 is shown extending from second end section 75 Original coupon 204 is machined/blended to a desired thickness removing all oxidized and damaged material. In addition to processing original coupon 204, a machined surface 208 is formed in second end section 75 to form a coupon receiving element. In the exemplary aspect shown, coupon receiving element 210 includes a first slot 212 arranged on one side (not separately labeled) of original coupon 204 and a second slot 213 formed on an opposing side (also not separately labeled) of original coupon 204. A repair coupon 217 is positioned over original coupon 204 and seated within slots 212 and 213. Repair coupon 217 includes first and second ends 220 and 221 that are joined by first and second opposing sides 222 and 223 forming a generally rectangular cross-section. Second end 221 is provided with a boss receiving portion 225 that is sized to receive original coupon 204. Once in position, repair coupon 217 is joined to second end section 75 through a mechanical and/or metallurgical bond.

Figure 8:
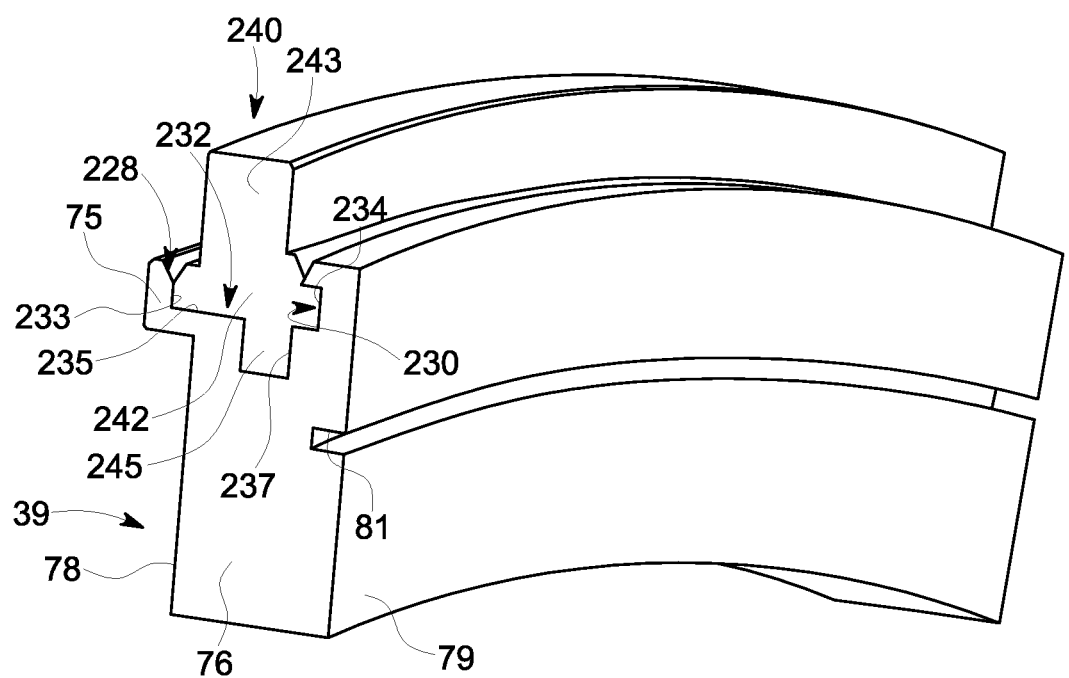
FIG. 8 is a partial plan view of a repair coupon mounted to a diaphragm rail member in accordance with yet still another aspect of the exemplary embodiment.

FIG. 8, wherein like reference numbers represent corresponding parts in the respective views, illustrates a machined surface 228 in accordance with another exemplary aspect formed in second end section 75. Machined surface 228 forms a coupon receiving element 230 that takes the form of a slot 232. Slot 232 includes first and second side walls 233 and 234 joined by a base wall 235. A groove 237 is formed in base wall 235. A repair coupon 240 is positioned within slot 232 and joined to second end section 75. Repair coupon 240 includes a base section 242 and a seal section 243. Base section 242 includes a tab element 245. Base section 242 is configured to nest within slot 232 with tab element 245 extending into groove 237. The engagement of tab element 245 and groove 237 provides additional support to repair coupon 240. Once installed into repair coupon receiving element 230, repair coupon 240 is joined to second end section 75 through a mechanical and/or a metallurgical bond.

Figure 9:
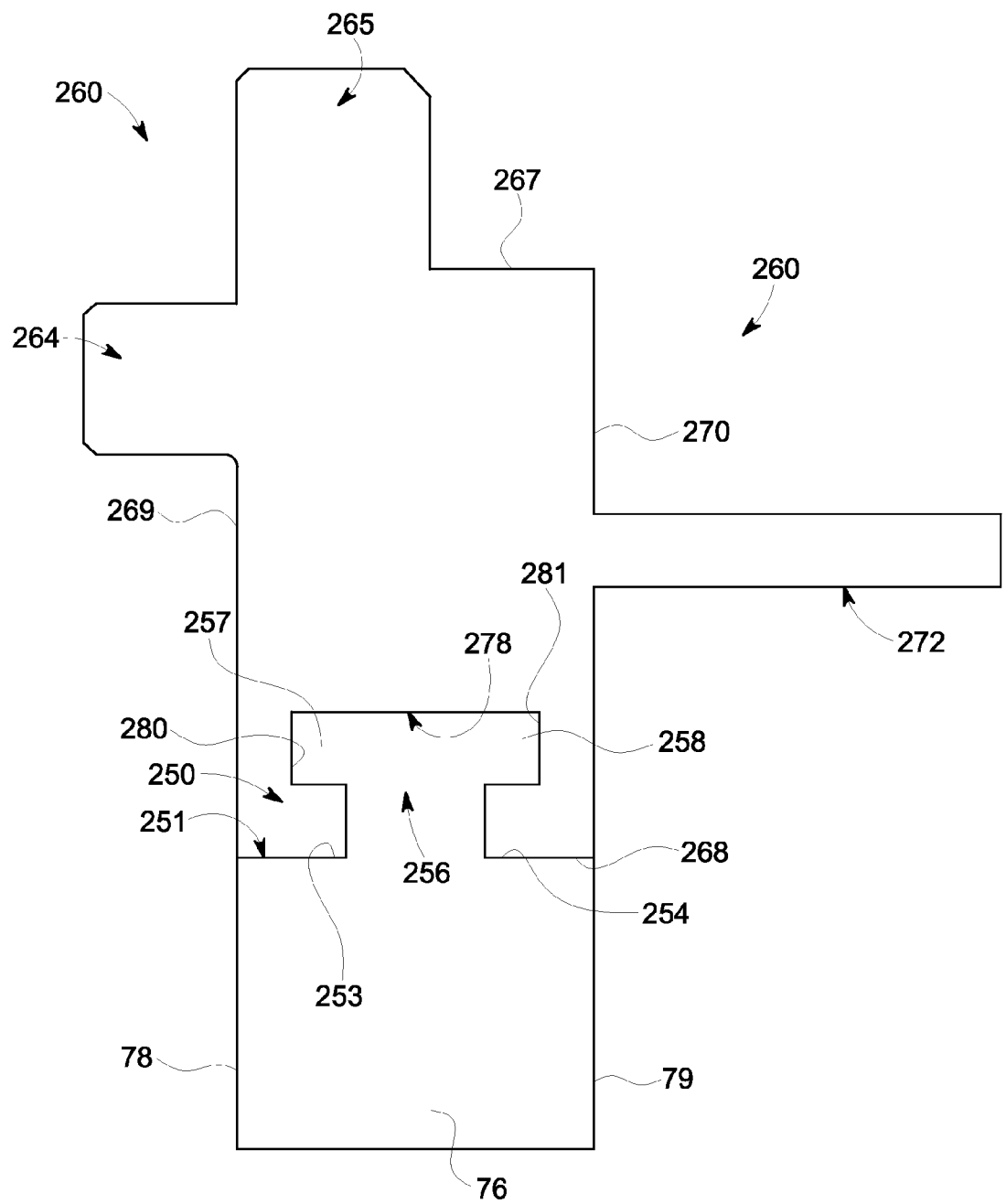
FIG. 9 is a partial plan view of a repair coupon mounted to a diaphragm rail member in accordance with still another aspect of the exemplary embodiment.

FIG. 9, wherein like reference numbers represent corresponding parts in the respective views, illustrates a machined surface 250 in accordance with still another exemplary aspect formed in second end section 75 of second rail member 39. Machined surface 250 represents a removal of a portion of material from second end section 75 that includes discourager seal mounting section 81. The removal of the material at second end section 75 may be necessary due to substantial damage, oxidation of second rail member 39. First and second slots 253 and 254 are formed in second end section 75. First slot 253 extends from inner surface section 78 into intermediate section 76. Second slot 254 is arranged opposite to first slot 253 and extends from outer surface section 79 into intermediate section 76. First and second slots 253 and 254 form a tab element 256 having first and second opposing extended regions 257 and 258 that form a generally t-shaped cross-section. A repair coupon 260 is mounted to second end section 75 at coupon receiving element 251.

Repair coupon 260 includes a base section 264 and a seal section 265. Base section 264 includes first and second opposing ends 267 and 268 that are joined by first and second opposing sides 269 and 270 to form a generally rectangular profile. Second side 270 is provided with a discourager seal 272 that replaces discourager seal mounting section 81, removed when forming coupon receiving element 251. Base section 264 also includes a central recess 278 formed in second end 268. Central recess 278 includes first and second extended portions 280 and 281 that are configured to receive first and second extended regions 257 and 258 of tab element 256. In accordance with the exemplary aspect shown, repair coupon 260 is mounted to second end section 75 by sliding tab element 256 through central recess 278. Once in position, repair coupon 260 is joined to second end section 75 by a mechanical and/or a metallurgical bond.

Figure 10:
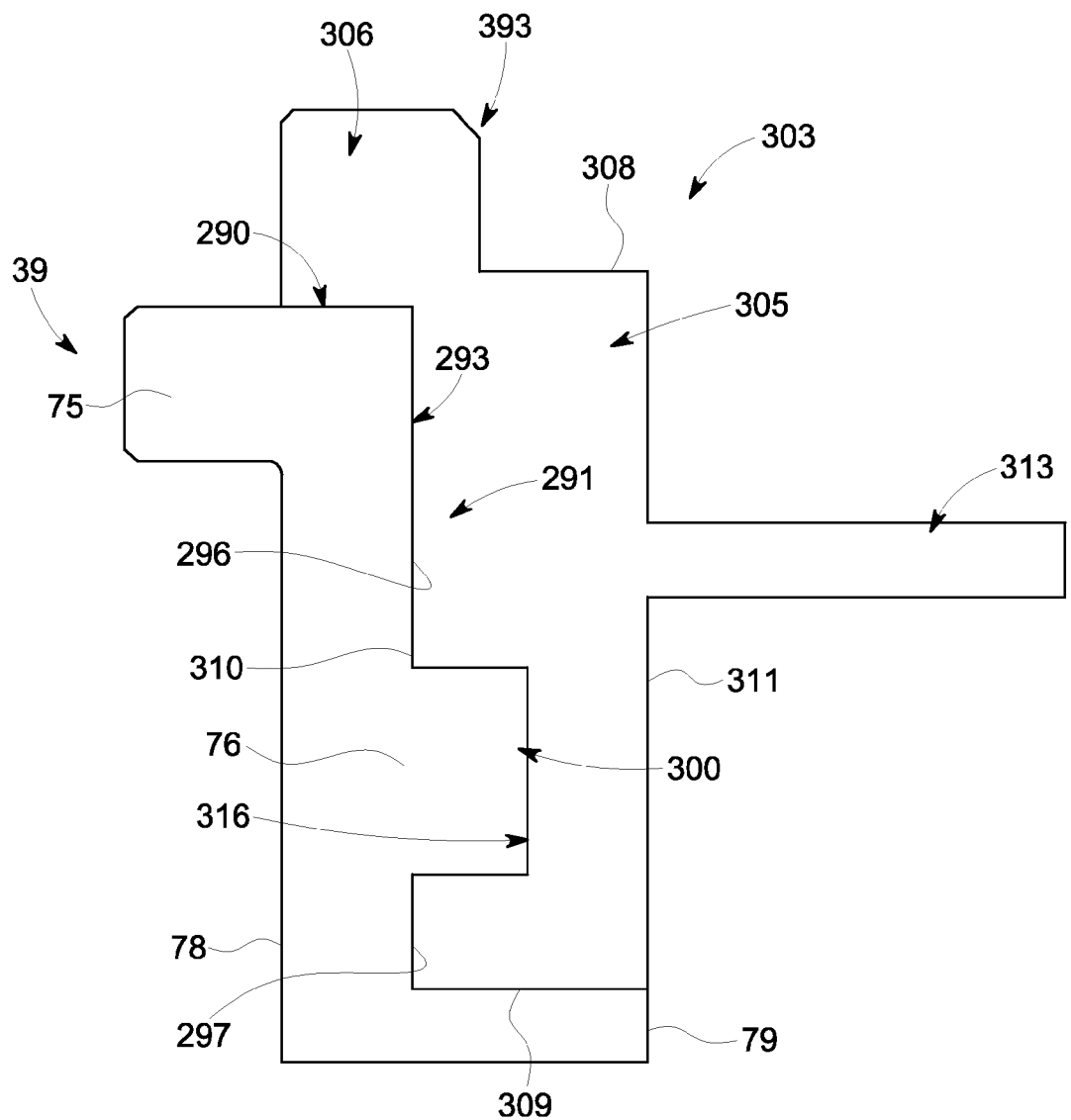
FIG. 10 is a partial plan view of a repair coupon mounted to a diaphragm rail member in accordance with yet another aspect of the exemplary embodiment.

FIG. 10, wherein like reference numbers represent corresponding parts in the respective views, illustrates first and second machined surfaces 290 and 291 in accordance with yet another exemplary aspect formed in second end section 75. First machined surface 290 is formed in a terminal end portion (not separately labeled) of second end section 75 and second machined surface 291 is formed in outer surface section 79. A coupon receiving element 293 is formed in second machined surface 291. Coupon receiving element 293 includes a first groove or slot 296 spaced from a second slot 297 to form a boss 300. A repair coupon 303 is mounted to second end section 75 at coupon receiving element 293. Repair coupon 303 includes a base section 305 and a seal section 306. Base section 305 includes first and second opposing ends 308 and 309 that are joined by first and second opposing sides 310 and 311. Second side 311 includes a discourager seal 313 that replaces discourager seal mounting section 81 removed when forming first and second slots 296 and 297. First side 310 includes a boss receiving portion 316 that is configured to engage with and receive boss 300. Once in place, repair coupon 303 may be joined to second end section 75 using a mechanical and/or a metallurgical bond.

Figure 11:
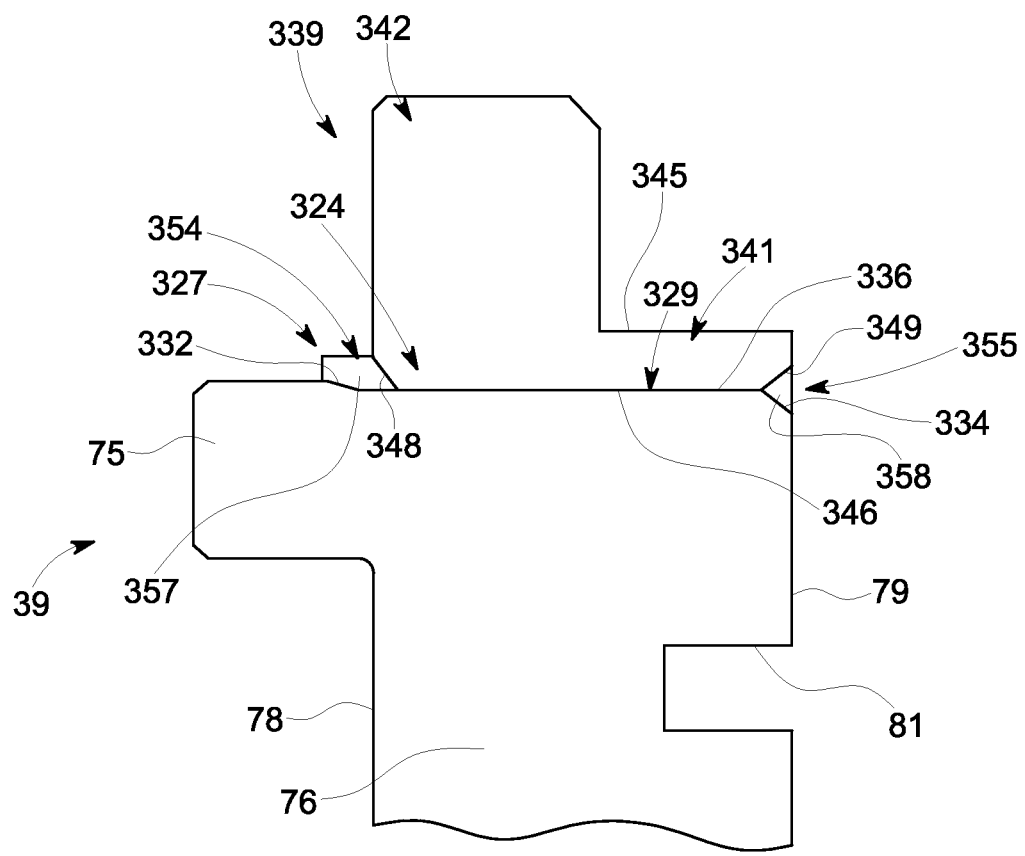
FIG. 11 is a partial plan view of a repair coupon mounted to a diaphragm rail member in accordance with another aspect of the exemplary embodiment.

FIG. 11, wherein like reference numbers represent corresponding parts in the respective views, illustrates a machined surface 324 in accordance with yet still another exemplary aspect formed in second end section 75. Machined surface 324 includes a first step section 327 that defines a coupon receiving element 329. A first angled surface 332 is provided at step section 327 and a second angled surface 334 is provided at outer surface section 79. A substantially horizontal planar surface 336 extends between first and second angled surfaces 332 and 334. A repair coupon 339 is provided on coupon receiving element 329. Repair coupon 339 includes a base section 341 that rests upon substantially horizontal planer surface 336 and a seal section 342. Base section 341 includes a first end 345 and a second end 346. A first angled section or chamfer 348 is formed on a first side (not separately labeled) of base section 341 and a second angled section or chamfer 349 is formed on a second side (also not separately labeled) of base section 341. When repair coupon 339 is positioned on substantially horizontal planar surface 336, first chamfer 348 aligns with first angled surface 332 and second chamfer 349 aligns with second angled surface 334. A first metallurgical bond 354 is formed between first chamfer 348 and first angled surface 332 and a second metallurgical bond 355 is formed between second chamfer 349 and second angled surface 334. First and second metallurgical bonds 354 and 355 take the form of welds 357 and 358 that join repair coupon 339 to second end section 75.

Figure 12:
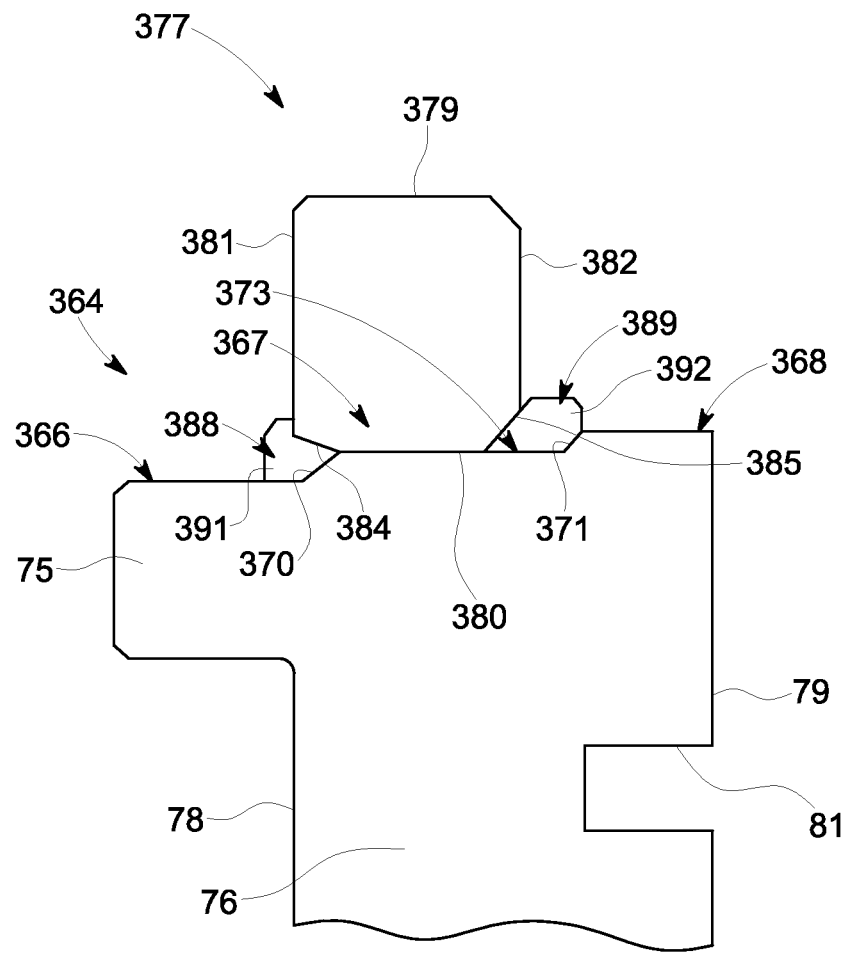
FIG. 12 is a partial plan view of a repair coupon mounted to a diaphragm rail member in accordance with yet still another aspect of the exemplary embodiment.

FIG. 12, wherein like reference numbers represent corresponding parts in the respective views, illustrates a machined surface 364 in accordance with yet still another aspect of the exemplary embodiment formed in second end section 75. Machined surface 364 includes a first step section 366 that leads to a second step section 367 and a third step section 368. First and second step sections 366 and 367 are separated by a first angled surface 370 and second and third step sections 367 and 368 are separated by a second angled surface 371. In accordance with the exemplary aspect shown, second step section 367 defines a coupon receiving element 373. A repair coupon 377 is provided on second step section 367. Repair coupon 377 includes first and second ends 379 and 380 joined by first and second opposing sides 381 and 382 that form a generally rectangular profile. A first chamfer 384 is formed between second end 380 and first side 381 and a second chamfer 385 is formed between second end 380 and second side 382. When repair coupon 377 is supported on coupon receiving element 373, first chamfer 384 aligns with first angled surface 370 and second chamfer 385 aligns with second angled surface 371. A first metallurgical bond 388 is formed between first chamfer 384 and first angled surface 370 and a second metallurgical bond 389 is formed between second chamfer 385 and second angled surface 371. First and second metallurgical bonds 388 and 389 take the form of first and second welds 391 and 392 that join repair coupon 377 to second end section 75.

Figure 13:
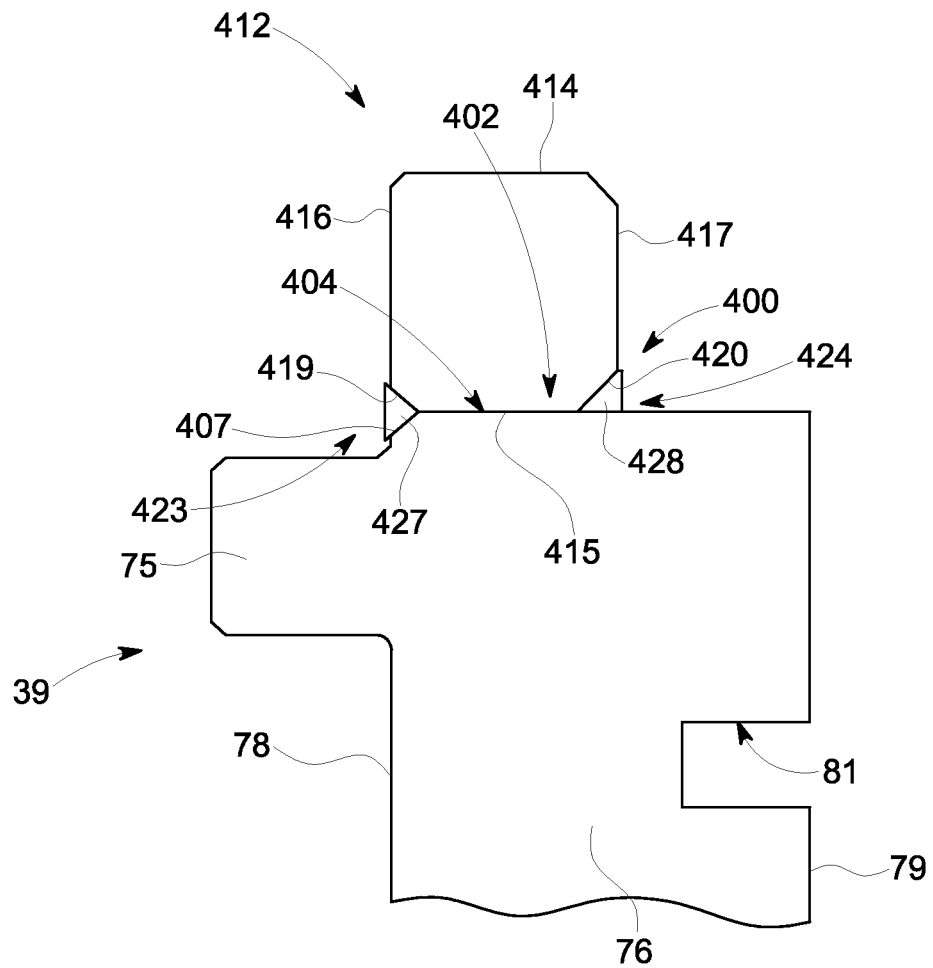
FIG. 13 is a partial plan view of a repair coupon mounted to a diaphragm rail member in accordance with yet another aspect of the exemplary embodiment.

FIG. 13, wherein like reference numbers represent corresponding parts in the respective views, illustrates a machined surface 400 in accordance with yet another aspect of the exemplary embodiment formed in second end section 75. Machined surface 400 includes a substantially horizontal planar surface 402 that eliminates any portion of the original coupon on second end section 75. Substantially horizontal planar surface 402 defines a coupon receiving element 404. An angled surface 407 is formed in machined surface 400 adjacent inner surface section 78. A repair coupon 412 is mounted to coupon receiving element 404. Repair coupon 412 includes first and second opposing ends 414 and 415 that are joined by first and second opposing sides 416 and 417 that form a generally rectangular profile. A first chamfer 419 is formed between second end 415 and first side 416 and a second chamfer 420 is formed between second end 415 and second side 417. First chamfer 419 aligns with angled surface 407 formed in machined surface 400 when repair coupon 412 is supported upon coupon receiving element 404. A first metallurgical bond 423 is formed between first chamfer 419 and angled surface 407 and a second metallurgical bond 424 is formed between second chamfer 420 and machined surface 400. First and second metallurgical bonds 423 and 424 constitute welds 427 and 428 that join repair coupon 412 to second end section 75.

Figure 14:
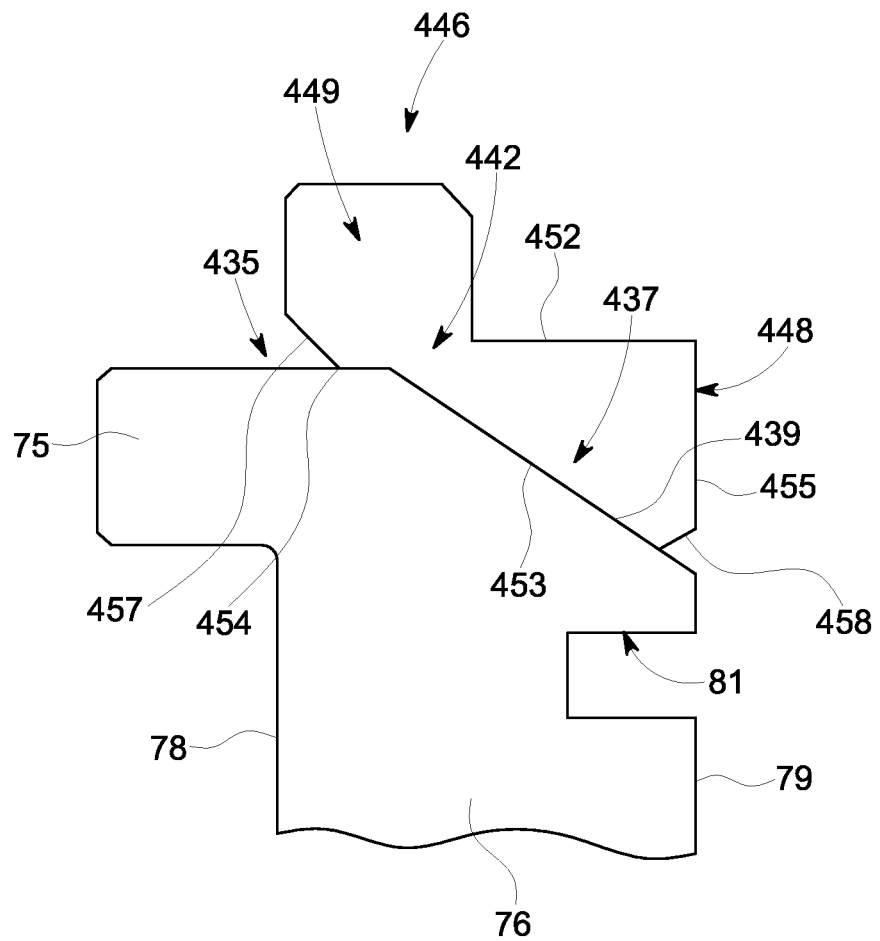
FIG. 14 is a partial plan view of a repair coupon mounted to a diaphragm rail member in accordance with still another aspect of the exemplary embodiment.

FIG. 14, wherein like reference numbers represent corresponding parts in the respective views, illustrates a first machined surface 435 in accordance with still another aspect of the exemplary embodiment formed in second end section 75. Second end section 75 is also shown to include a second machined surface 437. Second machined surface defines an angled surface or section 439 that extends between outer surface section 79 and first machined surface 435. Angled section 439 together with first machined surface 435 defines a coupon receiving element 442. A repair coupon 446 is positioned upon coupon receiving element 442 and joined to second end section 75. Repair coupon 446 includes a base section 448 and a seal section 449. Base section 448 includes first and second opposing ends 452 and 453 and first and second opposing sides 454 and 455. Second end 453 includes a first section (not separately labeled) configured to mate with first machined surface 435 and a second section (also not separately labeled), angled relative to the first section, configured to mate with angled section 439. A first chamfer 457 is provided between second end 453 and first side 454 and a second chamfer 458 is provided between second end 453 and second side 455. Chamfers 457 and 458 provide structure for receiving a metallurgical bond (not shown) that joins repair coupon 446 to second end section 75.

Figure 15:
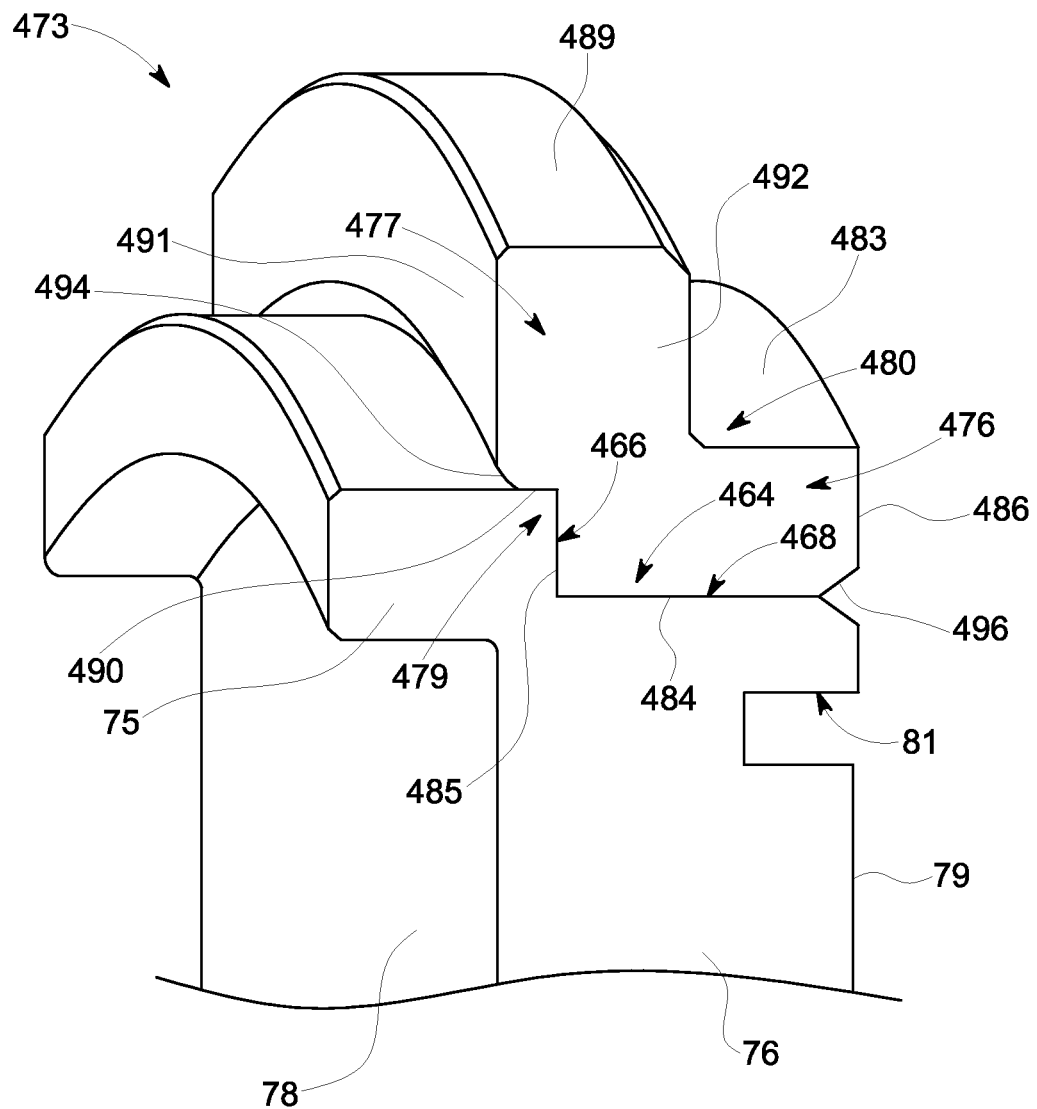
FIG. 15 is a partial plan view of a repair coupon mounted to a diaphragm rail member in accordance with another aspect of the exemplary embodiment.
Figure 16:
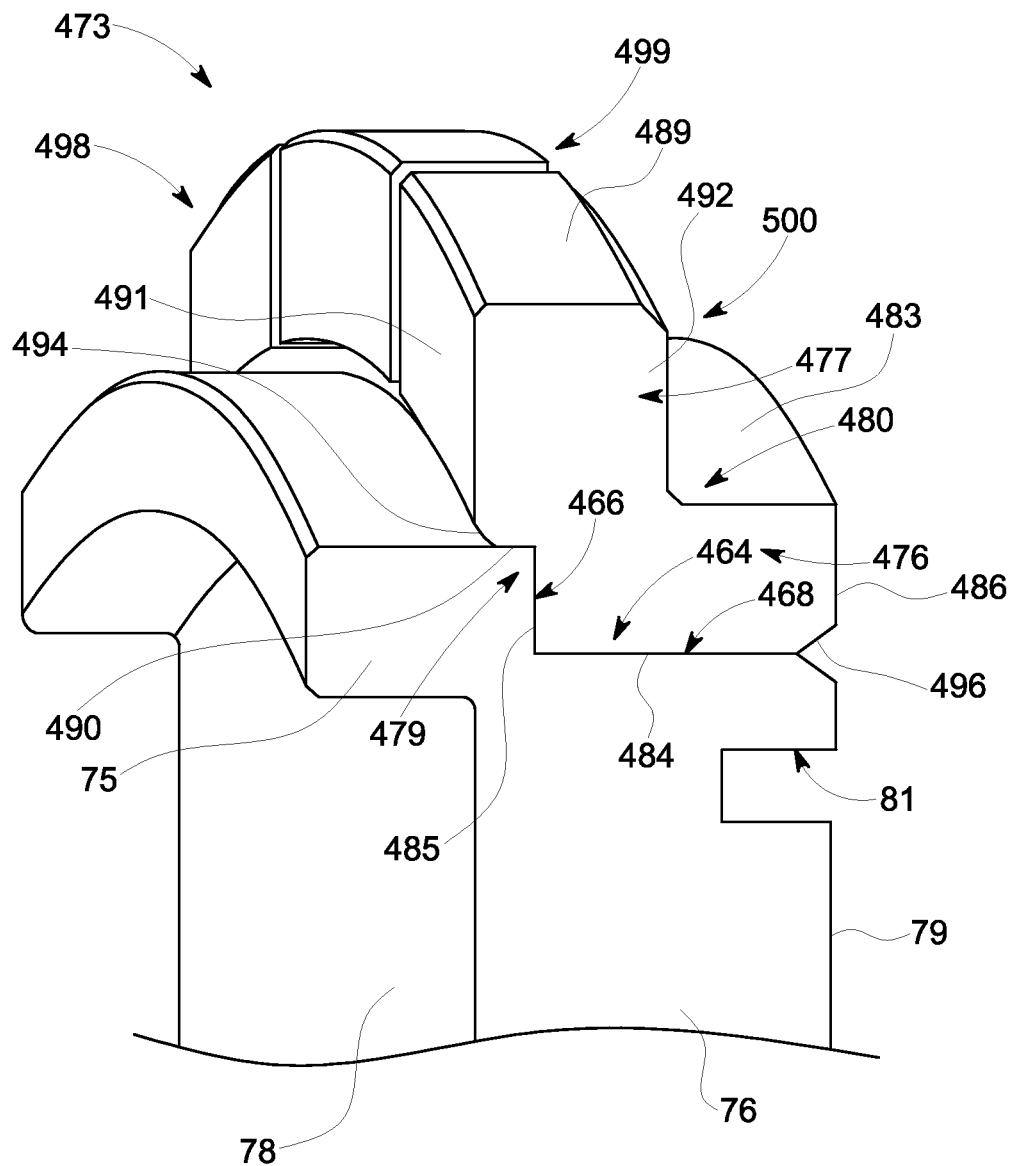
FIG. 16 is a partial plan view of a repair coupon mounted to a diaphragm rail member in accordance with still yet another aspect of the exemplary embodiment.

FIG. 15, wherein like reference numbers represent corresponding parts in the respective views, illustrates a machined surface 464 in accordance with another aspect of the exemplary embodiment formed in second end section 75. Machined surface 464 includes a step region 466 that forms a coupon receiving element 468. A repair coupon 473 is positioned upon second end section 75 at coupon receiving element 468. Repair coupon 473 includes a base section 476 and a seal section 477. Seal section 477 is off-set relative to base section 476 to form a first step zone or region 479 and a second step zone or region 480. Base section 476 includes first and second opposing ends 483 and 484 joined by first and second opposing sides 485 and 486. Similarly, seal section 477 includes first and second opposing ends 489 and 490 joined by first and second opposing sides 491 and 492. A first chamfer 494 is formed between second end 490 and first side 491 and a second chamfer 496 is formed between second end 484 and second side 486. First and second chamfers 494 and 494 provide structure for receiving a metallurgical bond (not shown) that joins repair coupon 473 to second end section 75. At this point it should be understood that repair coupon 473 can be formed from a number of repair coupon segments 498-500 as shown in FIG. 16.

Figure 17:
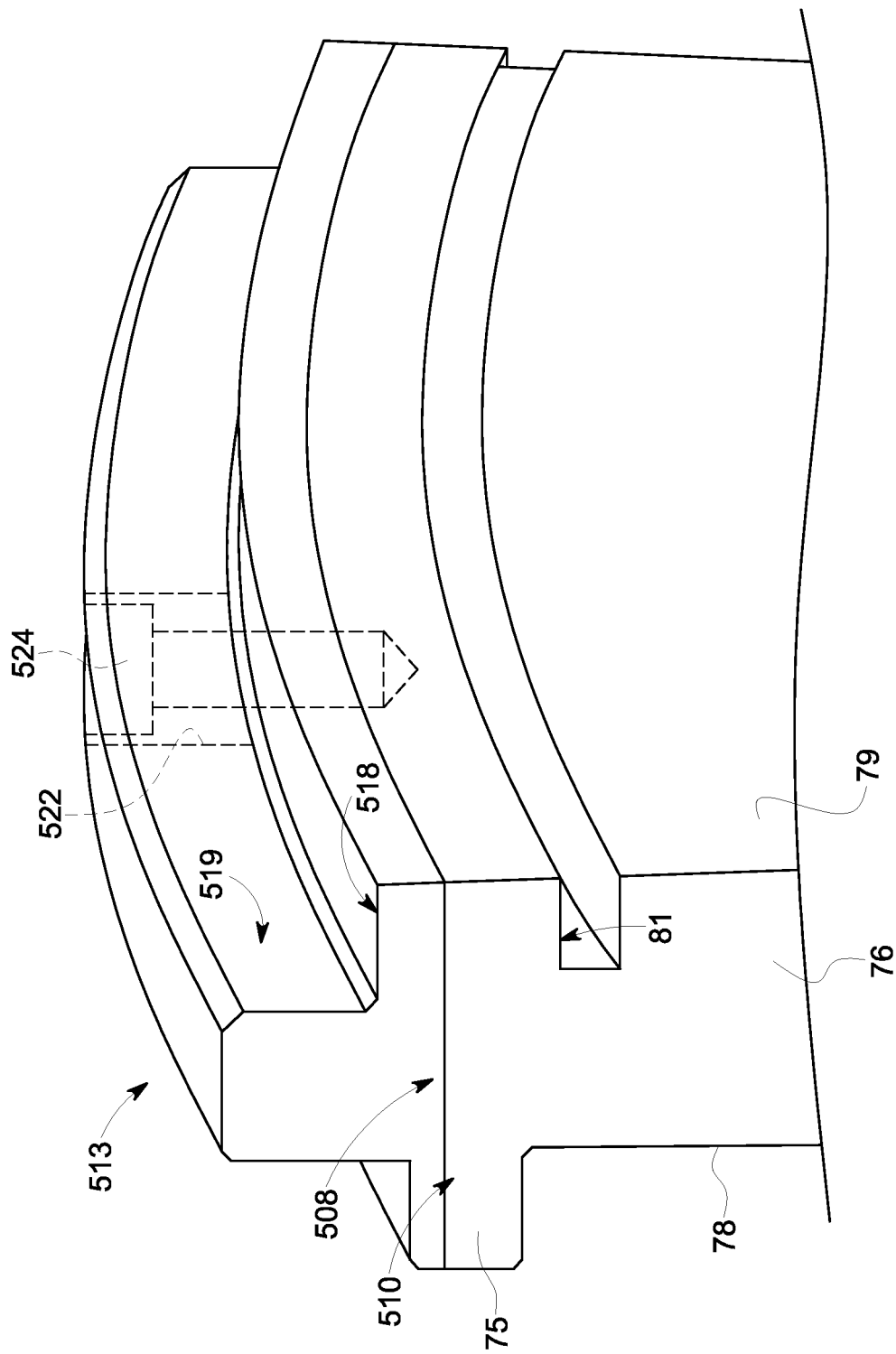
FIG. 17 is a partial plan view of a repair coupon mounted to a diaphragm rail member in accordance with yet still another aspect of the exemplary embodiment.

FIG. 17, wherein like reference numbers represent corresponding parts in the respective views, illustrates a machined surface 508 in accordance with yet still another aspect of the exemplary embodiment formed in second end section 75. Machined surface 508 defines a coupon receiving element 510 having a substantially planar surface (not separately labeled) provided with one or more threaded openings (also not separately labeled). That is, after forming machined surface 508, the original coupon is nearly completely removed from second end section 75. A repair coupon 513 is mounted to coupon receiving element 510. Repair coupon 513 includes a base section 518 and a seal section 519. Seal section 519 is mounted centrally along base section 518 to form a generally T-shaped cross-section. Repair coupon 513 includes one or more central passages 522 that are configured to align with the threaded openings formed in machined surface 508. Central passages 522 receive mechanical fasteners 524 that join repair coupon 513 to second end section 75. Of course it should be understood that repair coupon 513 could also be secured to second end section 75 through a metallurgical bond.

At this point it should be understood that the exemplary embodiments provide various systems for repairing a turbomachine diaphragm. Specifically, the exemplary embodiments provide various systems for replacing worn coupon seals. Instead of blending and applying multiple layers of welds to repair a seal coupon, the exemplary embodiments remove, either completely or substantially the existing original coupon and apply a new coupon to the diaphragm. The new repair coupon is joined to a diaphragm rail member using a variety of techniques that provide various benefits. The particular technique employed can be chosen based on an amount of damage to the existing coupon, amount of damage to the rail member, or other factors that dictate how a repair coupon may be added to the rail member. It should also be understood that the repair coupon(s) can be secured to the rail member through a variety of techniques including both mechanical and metallurgical bonds.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A turbomachine diaphragm comprising: a sealing section having a first end portion that extends to a second end portion through an intermediate portion;

at least one rail member including a first end section that extends from the first end portion of the sealing section to a second end section through an intermediate section having an inner surface section and an outer surface section, the second end section including a machined surface having a repair coupon mounting element; and a repair coupon mounted at the repair coupon mounting element and operatively connected to the at least one rail member, wherein the repair coupon mounting element comprises a first slot spaced apart from a second slot by a boss, and wherein the repair coupon is nested within the first, slot and the second slot and joined to the at least one rail member such that the boss extends into the repair coupon.

2. The turbomachine diaphragm according to claim 1, wherein the at least one slot comprises a substantially rectangular cross-section.

3. The turbomachine diaphragm according to claim 2, wherein the repair coupon is metallurgically bonded to the at least one rail member.

4. The turbomachine diaphragm according to claim 2, wherein the repair coupon is joined to the at least one rail member through a mechanical fastener.

5. The turbomachine diaphragm according to claim 2, wherein the at least one rail member includes at least one opening extending through one of the outer and inner surface sections into the at least one slot.

6. The turbomachine diaphragm according to claim 5, further comprising:
a fastener member extending through the at least one opening into the repair coupon.

7. The turbomachine diaphragm according to claim 2, wherein the repair coupon includes a tab element that extends into the first or second slot.

8. The turbomachine diaphragm according to claim 1, wherein the repair coupon includes a boss receiving portion configured and disposed to receive the boss extending from the outer surface section.

9. The turbomachine diaphragm according to claim 8, wherein the repair coupon includes a discourager seal.

10. A turbomachine diaphragm comprising:
a sealing section having a first end portion that extends to a second end portion through an intermediate portion;
at least one rail member including a first end section that extends from the first end portion of the sealing section to a second end section through an intermediate section having an inner surface section and an outer surface section, the second end section including a machined surface having a repair coupon mounting element; and
a repair coupon mounted at the repair coupon mounting element and operatively connected to the at least one rail member, the repair coupon joined to the at least one rail member at a mounting surface, wherein the repair coupon mounting element comprises a first step section spaced apart from a second step section by the mounting surface, and wherein the first step section, the second step section, and the mounting surface extend parallel to the sealing section and one of the first step section or the second step section is closer to the sealing section than the mounting surface.

11. The turbomachine diaphragm according to claim 10, wherein the repair coupon mounting element comprises an angled surface extending between one of the inner surface section and the outer surface section and the machined surface, the repair coupon being joined to the machined surface and the angled surface.

12. The turbomachine diaphragm according to claim 10, wherein the repair coupon includes a base section and a seal section forming at least one step zone, the base section being joined to the machined surface.

13. The turbomachine diaphragm according to claim 10, wherein the repair coupon is joined to the machined surface through a mechanical fastener.

14. The turbomachine diaphragm according to claim 10, wherein the repair coupon includes a plurality of repair coupon segments.

15. A method of repairing a turbomachine diaphragm, the method comprising:
removing a worn coupon from a diaphragm rail member forming a machined surface;
forming a repair coupon mounting element in the diaphragm rail member, wherein the repair coupon mounting element comprises a first slot spaced apart from a second slot by a boss or a first step section spaced apart from a second step section by a mounting surface, the first step section, the second step section, and the mounting surface extending parallel to the sealing section such that one of the first step section or the second step section is closer to the sealing section than the mounting surface;
positioning a repair coupon on the diaphragm rail member at the repair coupon mounting element; and
bonding the repair coupon to the machined surface at the repair coupon mounting element.

16. The method of claim 15, wherein forming the repair coupon mounting element in the diaphragm rail member includes machining a slot in an end portion of the diaphragm rail member.

17. The method of claim 16, wherein machining the slot in an end portion of the diaphragm rail member includes forming a slot having a generally T-shaped cross-section.

18. The method of claim 16, further comprising: forming an opening in an outer surface section of the diaphragm rail member that extends into the slot.

19. The method of claim 15, wherein forming the repair coupon mounting element in the diaphragm rail member includes forming an angled surface in the diaphragm rail member, the angled surface extending between an end portion and an outer surface section of the diaphragm rail member.

20. The method of claim 15, wherein bonding the repair coupon to the machined surface at the repair coupon mounting element includes metallurgically joining the repair coupon to the diaphragm rail member.

21. The method of claim 20, wherein metallurgically joining the repair coupon to the diaphragm rail member includes one of welding the repair coupon to the diaphragm rail member and welding the repair coupon to the diaphragm rail member.

22. The method of claim 15, wherein bonding the repair coupon to the machined surface at the repair coupon mounting element includes joining the repair coupon to the diaphragm rail member with a mechanical fastener.

23. The method of claim 15, wherein positioning a repair coupon on the diaphragm rail member at the repair coupon mounting element includes positioning multiple repair coupon segments on the diaphragm rail member.

\* \* \* \* \*